US008557596B2

(12) United States Patent
Trogler et al.

(10) Patent No.: US 8,557,596 B2
(45) Date of Patent: Oct. 15, 2013

(54) FLUORESCENCE DETECTION OF NITROGEN-CONTAINING EXPLOSIVES AND BLUE ORGANIC LED (75) Inventors: William C. Trogler, Del Mar, CA (US); Jason Sanchez, The Woodlands, TX (US)

(73) Assignee: The Regents of the University of California, Oakland, CA (US)

( * ) Notice: Subject to any disclaimer, the term of this patent is extended or adjusted under 35 U.S.C. 154(b) by 440 days.

(21) Appl. No.: 12/667,736

(22) PCT Filed: Jul. 10, 2008

(86) PCT No.: PCT/US2008/008553
§ 371 (c)(1),
(2), (4) Date: Nov. 8, 2010

(87) PCT Pub. No.: WO2009/011806
PCT Pub. Date: Jan. 22, 2009

(65) Prior Publication Data
US 2011/0057116 A1 Mar. 10, 2011

Related U.S. Application Data (63) Continuation-in-part of application No. PCT/US2008/001193, filed on Jan. 29, 2008.

(60) Provisional application No. 60/961,057, filed on Jul. 18, 2007.

(51) Int. Cl.
*G01N 33/22* (2006.01)
*G01N 21/64* (2006.01)

(52) U.S. Cl.
USPC ........... 436/106; 436/107; 436/166; 436/167; 436/172; 422/425; 422/82.06; 422/82.07; 422/82.08

(58) Field of Classification Search
USPC .......... 436/106–107, 166–167, 172; 422/400, 422/425, 82.05–82.08
See application file for complete search history.

(56) References Cited

U.S. PATENT DOCUMENTS 4,788,039 A * 11/1988 Glattstein ............... 422/430
5,063,297 A   11/1991 Hardenbrook
(Continued)

FOREIGN PATENT DOCUMENTS

| WO | WO 02-38653 | 5/2002 |
| WO | WO 2005-047363 | 5/2005 |
| WO | WO 2007-024227 | 3/2007 |

OTHER PUBLICATIONS

Korshak, V. V. et al, Russian Chemical Bulletin 1962, 11, 2153-2155.*

(Continued)

*Primary Examiner* — Arlen Soderquist
(74) *Attorney, Agent, or Firm* — Greer, Burns & Crain Ltd.

(57) ABSTRACT

The invention provides a sensor for detecting nitrogen containing high explosives. The sensor includes a substrate and a blue-photoluminescent metallofluorene copolymer to be carried on said substrate during testing for nitrogen containing high explosives. The copolymer is preferably a blue-photoluminescent metallofluorene copolymer, and preferably is a vinyl bridged silafluorene copolymer. A method for detecting nitrogen containing high explosives involves exposing a copolymer to an analyte, preferably by spraying the copolymer or otherwise coating the substrate after it has been exposed to analyte and then exciting the copolymer to luminesce. The copolymer is observed for fluorescence quenching, which can be through human or electronic observation. The invention also provides for synthesis of a vinyl bridged silafluorene polymer by providing diethynylmetallofluorene and dihydrosilafluorene as precursors and conducting catalytic hydrosilation of the precursors. In a blue emitting organic light emitting diode of the invention, an emitting layer is blue-photoluminescent metallofluorene copolymer.

26 Claims, 6 Drawing Sheets

(56) References Cited

U.S. PATENT DOCUMENTS

| | | | |
|---|---|---|---|
| 5,115,459 | A | 5/1992 | Bertozzi |
| 5,162,478 | A * | 11/1992 | Barton et al. .................. 528/15 |
| 5,498,736 | A * | 3/1996 | Tamao et al. ................ 556/406 |
| 6,169,193 | B1 | 1/2001 | West et al. |
| 6,376,694 | B1 | 4/2002 | Uchida et al. |
| 2003/0100123 | A1 | 5/2003 | Schanze et al. |
| 2003/0178607 | A1 | 9/2003 | Swager et al. |
| 2004/0155202 | A1 | 8/2004 | Poteet |
| 2005/0101026 | A1 | 5/2005 | Sailor et al. |
| 2007/0248839 | A1 * | 10/2007 | Towns et al. ................. 428/690 |
| 2009/0137059 | A1 | 5/2009 | Trogler et al. |
| 2010/0291698 | A1 * | 11/2010 | Trogler et al. ............... 436/110 |

OTHER PUBLICATIONS

Luneva, L. K. et al, Russian Chemical Bulletin 1968, 17, 160-163.*
Chang, L. S. et al, Organometallics 1989, 8, 1885-1893.*
Corriu, R. J. P. et al, Journal of Polymer Science: Part C: Polymer Letters 1990, 28, 431-437.*
Takahashi, T. et al, Journal of the American Chemical Society 1991, 113, 8564-8566.*
Corriu, R. J.-P. et al, Journal of Organometallic Chemistry 1993, 456, 35-39.*
Pang, Y. et al, Macromolecules 1993, 26, 5671-5675.*
Rushkin, I. L. et al, Macromolecules 1996, 29, 5784-5787.*
Chauhan, B. P. S. et al, Chemistry Letters 1997, 785-786.*
Ohshita, J. et al, Acta Polymerica 1998, 49, 379-403.*
Buriak, J. M. et al, Journal of the American Chemical Society 1999, 121, 11491-11502.*
Tamao, K. et al, Journal of Organometallic Chemistry 2000, 611, 5-11.*
Yu, W.-L. et al, Advanced Materials 2000, 12, 828-831.*
Thomas, R. K. J. et al, Organometallics 2001, 20, 2262-2269.*
Chen, J. et al, Macromolecules 2003, 36, 4319-4327.*
Lam, J. W. Y. et al, Macromolecular Symposia 2003, 196, 29-89-300.*
Yamashita, H. et al, Polymer 2003, 44, 7089-7093.*
Law, C. C. W. et al, Journal of Inorganic and Organometallic Polymers 2004, 14, 39-51.*
Wang, F. et al, Macromolecules 2005, 38, 2253-2260.*
Saxena, A. et al, Chemistry of Materials 2005, 17, 2181-2185.*
Chan, K. L. et al, Journal of the American Chemicall Society 2005, 127, 7662-7663.*
Toal, S. J. et al, Organometallics 2005, 24, 3081-3087.*
Lee, S. H. et al, Journal of the American Chemicall Society 2005, 127, 9071-9078.*
Toal, S. J. et al, Chemical Communications 2005, 5465-5467.*
Kim, J. H. et al, Bulletin of the Korean Chemical Society 2006, 27, 869-874.*
Wang, E. et al, Journal of Materials Chemistry 2006, 16, 4133-4140.*
Toal, S. J. et al. Journal of Forensic Science 2007, 52, 79-83.*
Chen, R.-F. et al, Synthetic Metals 2006, 156, 1161-1167.*
Yamaguchi, S. et al, Chemistry Letters 1998, 89-90.*
Toal, Sarah J., et .al, Polymer Sensors for Nitroaromatic Explosives Destection, Journal of Materials Chemistry, 2006, pp. 2871-2883.
Albbizane, A., et al., "Organolithium Route to Poly(arylsilane)s", *Polymer International*, 26, 1991, 93-96.
Andrew, T.L., et al., "A Fluorescence Turn-On Mechanism to Detect High Explosives RDX and PETN", *J. Am. Chem. Soc.*, 2007, 129, 7254.
Benfaremo, Nicholas, et al., "Synthesis and Characterization of Luminescent Polymers of Distyrylbenzenes with Oligo(ethylene glycol) Spacers", *Macromolecules*, 1993, 31, p. 3595-3599.
Carre, M.C., et al., "Fluorimetric nitrite analysis using 2,3-diaminonaphthalene: an improvement of the method", *Analysis*, 1999, 27, 835.
Damiani, P., et al., "Fluormetric Determination of Nitrite", Talanta, vol. 33, No. 8, 1986,33, 649.
Kim, Dong Seok, et al., "Synthesis and Properties of Poly(silylenevinylene(bi)phenylenevinylene)s by Hydrosilylation Polymerization", *Journal of Polymer Science Part A: Polymer Chemistry*, vol. 37, Issue 15, Aug. 1, 1999, 2933-2940.
Plexus Scientific, Expray Detection System, http://expray.plexsci.com/site/index/products/kits/explosionkits/ex.html Nov. 8, 2010.
Sohn, Honglae, et al., "Detection of TNT and Picric Acid on Surfaces and in Seawater by Using Photoluminescent Polysiloles", *Angew. Chem. Int. Ed.*, 2001, 40, No. 11.
Sohn, Honglae, et al., "Detection of Nitroaromatic Explosives Based on Photoluminsecent Polymers Containing Mettaloles", *J. Am. Chem. Soc.*, vol. 125, No. 13, 2003.
Yang, Jye-Shane, et al. "Porous Shape Persistent Fluorescent Polymer Films: An Approach to TNT Sensory Materials", *J. Am. Chem. Soc.*, 1998, 120, 5321-5322.
Yang, Jye-Shane, et. al. "Fluorescent Porous Polymer Films as TNT Chemosensors: Electronic and Structural Effects", *J. Am. Chem. Soc.*, 1998, 120, 11864-11873.
Sanchez, Jason C., et al., "Synthesis, Luminescence Properties and Explosives with 1,1-Tetraphenylsilole- and 1,1-Silafluorene-vinylene Polymers", *Chem. Mater.*, 2007, 19, 6459-6470.

\* cited by examiner

FIG. 5A PSFI-1

FIG. 5B PSFI-2

FIG. 5C PSFI-3

+

$H_2PtCl_6$, toluene
rt 48h

FIG. 6

FLUORESCENCE DETECTION OF NITROGEN-CONTAINING EXPLOSIVES AND BLUE ORGANIC LED

PRIORITY CLAIM AND REFERENCE TO RELATED APPLICATION

The application claims priority under 35 U.S.C. §119 from prior provisional application Ser. No. 60/961,057, which was filed on Jul. 18, 2007, and is a continuation-in-part that claims priority under 35 U.S.C. 120 from PCT/US08/01193, which was filed on Jan. 29, 2008.

STATEMENT OF GOVERNMENT INTEREST

This invention was made with government support under F49620-02-1-0288 awarded by Air Force Office of Scientific Research. The government has certain rights in the invention.

FIELD

A field of the invention is analyte detection. Another field of the invention is light emitting diodes. Example applications of the invention include safety screenings, such as screenings of cargo, facilities or people, and forensic investigations.

BACKGROUND

Chemical sensors can be used to detect ultra-trace explosive analytes. The critical importance of detecting explosives in a wide variety of areas, such as minefields, military bases, remediation sites, and urban transportation areas, has spurred significant research into developing and improving chemical sensors. Safety screenings also encompass counter-terrorism efforts, such as personnel or baggage screening, facility protection and cargo screening. In addition to such safety screenings, the detection of explosive analytes is important for forensic investigations, such as the examination of post-blast residue.

Typical chemical sensors are small synthetic molecules that produce a measurable signal upon interaction with a specific analyte. Chemical sensors are cost effective and can succeed where other techniques fail to detect explosives. Modern land mines, for example, are encased in plastic and can be missed by metal detectors. Trained dogs are effective, but are expensive and difficult to maintain. Other detection methods, such as gas chromatography coupled with a mass spectrometer, surface-enhanced Raman, nuclear quadrupole resonance, energy-dispersive X-ray diffraction, neutron activation analysis and electron capture detection are highly selective, but are expensive and not easily adapted to a small, low-power package.

Conventional chemical sensors also have limitations that render them ineffective under some conditions. Sensing TNT (2,4,6-trinitrotoluene) and picric acid in groundwater or seawater is important for the detection of buried, unexploded ordnance and for locating underwater mines, but most chemical sensor detection methods are only applicable to air samples because of interference problems that are encountered in complex aqueous media. Such conventional chemical sensors are therefore inefficient in environmental applications for characterizing soil and groundwater contaminated with toxic TNT at military bases and munitions production and distribution facilities. In addition, conventional chemical sensors, such as highly π-conjugated, porous organic polymers, can be used to detect vapors of electron deficient chemicals, but require many steps to synthesize and are not selective to explosives.

Many conventional chemical sensors are not amenable to manufacture as inexpensive, low-power portable devices. Typical chemical sensing methods are limited to vapor phase detection, which is disadvantageous given the low volatility of many explosives. Nitroaromatic explosives such as TNT have moderate vapor pressures ($7 \times 10^{-6}$ Torr at room temperature), but at low surface concentrations, the vapor concentration of TNT molecules is significantly lower than its equilibrium vapor pressure. Nitramine high explosives, such as RDX (cyclotrimethylenetrinitramine, also known as cyclonite, hexogen, and T4) and HMX (cyclotetramethylene-tetranitramine) have substantially lower vapor pressures ($5 \times 10^{-9}$ and $8 \times 10^{-11}$ Torr, respectively) than TNT, which makes vapor detection of these compounds very difficult. Vapor concentrations can be lowered even more when these compounds are enclosed in a bomb or mine casing, or when they are present in a mixture with other explosives. The broad array of nitrogen-based explosives has rendered it difficult to provide a single method whereby multiple types of explosives may be detected.

While efficient explosives detection has always been a predominating concern, there exists a renewed urgency for development of rapid and highly sensitive detection of organic, nitrogen-based explosives, including nitroaromatic compounds, nitramine-based explosives and nitrate ester-based explosives. In addition to detecting TNT, for example, detection of the nitrogen-based plastic explosives compounds associated with improvised explosives devices (IEDs), namely RDX and PETN (pentaerythritol tetranitrate), has life-saving applications in a vast array of applications, such as forensic, military, and civilian homeland security purposes.

Practical blue LEDs have been developed after decades of effort. Early blue LEDs developed in the 1970s provided little output, and in the 1990s high brightness blue LEDs were demonstrated with Group III-V materials. As with other Group III-V devices, blue LEDs made from Group III-V materials are more expensive and more difficult to fabricate than silicon fabrications.

SUMMARY OF THE INVENTION

The invention provides a sensor for detecting nitrogen containing high explosives. The sensor includes a substrate and a blue-photoluminescent metallofluorene copolymer to be carried on said substrate during testing for nitrogen containing high explosives. The copolymer is preferably a blue-photoluminescent metallofluorene copolymer, and preferably is a vinyl-bridged silafluorene copolymer. A method for detecting nitrogen containing high explosives involves exposing a copolymer to an analyte, preferably by spraying the copolymer or otherwise coating the substrate after it has been exposed to analyte and then exciting the copolymer to luminesce. The copolymer is observed for fluorescence quenching, which can be through human or electronic observation. The invention also provides for synthesis of a vinyl bridged silafluorene polymer by providing diethynylfluorene and dihydrosilafluorene as precursors and conducting catalytic hydrosilation of the precursors.

In a blue emitting organic light emitting diode of the invention, an emitting layer is blue-photoluminescent metallofluorene copolymer.

DETAILED DESCRIPTION OF THE PREFERRED EMBODIMENTS

An embodiment of the present invention provides for the synthesis of a vinyl bridged metallofluorene copolymer (PSFA), which is a copolymer of a polymetallofluorene and polyacetylene polymer. The PSFA, which is preferably a vinyl bridged silafluorene copolymer, can be used in preferred methods for detecting a broad range of nitrogen-based explosives that may be present in a sampling substrate. More generally, blue-photoluminescent silafluorene copolymers can be used in preferred sensing methods of the invention. Detectable nitrogen containing explosives include, for example, nitroaromatic-based, nitramine-based and nitrate ester-based high explosives. PSFA is a single reagent that can detect a wide range of nitrogen containing explosives in methods of the invention, which rely upon fluorescence quenching of the PSFA by nitrogen containing explosives.

Preferred embodiments of the invention are directed to the synthesis of alternating silafluorene-divinylfluorene, silafluorene-dimethyldivinylfluorene, or silafluorene-divinylspirobifluorene photoluminescent copolymers and the use of such copolymers for the detection of organic nitrogen-based explosives. The silafluorene-divinylfluorene containing polymers additionally exhibit photochemical reactivity on continued irradiation which allows the selective detection of nitrate esters, as well as organic peroxide explosives.

The invention provides a sensor for detecting nitrogen containing high explosives. The sensor includes a substrate and a blue-photoluminescent metallofluorene copolymer to be carried on said substrate during testing for nitrogen containing high explosives. The copolymer is preferably a blue-photoluminescent metallofluorene copolymer, and preferably is a vinyl bridged silafluorene copolymer. A method for detecting nitrogen containing high explosives involves exposing a copolymer to an analyte, preferably by spraying the copolymer or otherwise coating the substrate after it has been exposed to analyte and then exciting the copolymer to luminesce. The copolymer is observed for fluorescence quenching, which can be through human or electronic observation. The invention also provides for synthesis of a vinyl bridged silafluorene polymer by providing diethynylmetallofluorene and dihydrosilafluorene as precursors and conducting catalytic hydrosilation of the precursors. In a blue emitting organic light emitting diode of the invention, an emitting layer is blue-photoluminescent metallofluorene copolymer.

A preferred embodiment sensor of the invention includes a sampling substrate and PSFA. During testing, the sampling substrate is exposed to an environment that is suspected of containing one or more nitroaromatic, nitramine and nitrate ester-based explosives.

Embodiments of the invention include methods and sensors for detecting nitrogen-based explosives with a vinyl bridged metallofluorene copolymer, preferably a vinyl bridged silafluorene copolymer, combined with photoluminescent metallole polymers and copolymers, for detection of nitroaromatic compounds based on photoluminescence quenching to provide to further confirmation of the detected analytes. United States Published Applications Nos. 20060051872 (published Mar. 9, 2006), and 20050101026 (Published May 12, 2005) describe methods and sensors that can be used in combination with the present PSFA sensors and methods.

Other embodiments of the invention include an organic LED that is emits in the blue range. The PSFA polymers and the polymers in the above mentioned published applications can be used to form organic LEDs that emit in the blue range. The PSFA, preferably a vinyl bridged silafluorene copolymer, serves as the emitting layer of a multi-layer organic light emitting diode. Preferred embodiments include organic LEDs that emit in the blue range having a vinyl bridged silafluorene copolymer emitting layer.

Embodiments of the invention are directed to the synthesis of inorganic polymers and use of inorganic polymers, namely an alternating metallofluorene-acetylene photoluminescent copolymer for the detection of organic nitrogen-based explosives. Preferred embodiments of the invention provide a one-step method for detecting most nitrogen based high explosives used in improvised explosive devices. Methods and sensors of the invention are sensitive, rapid, low cost, and capable of detecting a wide range of explosives.

In a preferred method of the invention, the PSFA (vinyl bridged metallofluorene copolymer, and preferably a vinyl bridged silafluorene copolymer) is excited at an appropriate range using a UV-B (302 nm) or UV-C (254 nm), blacklight, LED or other illumination source. Detection of nitrogen-containing explosives is confirmed by detecting fluorescence quenching at 370 nm-430 nm of the copolymer by the analyte (i.e. the explosive). The visible spectrum is approximately 400-700 nm, so the quenching overlaps only slightly in the visible range. The PSFA can also be modified to shift the range, for example by modification with ring-substituted silofluorene(s) that can shift the emission out to the visible range. Also, increasing the conjugation of the organic bridge would be expected to move the emission toward the visible range.

Other embodiments of the invention include an organic LED that emits in the blue range. The PSFA polymers can be used as a blue emitting layer or combined with the polymers in the published applications identified above to form the emitting layer of organic LEDs that emit in the blue range. This is very valuable because there is a shortage of candidate blue-emitting compounds. Preferred embodiments include organic LEDs having a PSFA emitting layer that emits in the blue range.

While previous work has provided methods and sensors useful for detecting trace quantities of nitroaromatic compounds, embodiments of the instant invention are especially advantageous in providing a single copolymer (PSFA) for the fluorimetric detection of a range of common nitrogen containing explosives including nitroaromatic (e.g. TNT), nitrate ester (e.g. PETN) and nitramine-based explosives (e.g. RDX). The high energy of the excited state in the UV luminescent PSFA offers an increased driving force for electron transfer to the explosive analyte and improved detection limits by electron transfer quenching. Detection is carried out in a one-step fluorescence quenching mechanism. Embodiments of the invention are particularly advantageous in that the method is sensitive, rapid, low cost, and capable of detecting a wide range of trace explosives on a variety of surfaces, including bomb makers' hands, clothing, hair, dwellings, packages, cars, and door knobs to their houses, to name a few.

Metallofluorenes contain silicon (Si) or germanium (Ge) in a fluorene framework. Poly-metallofluorenes are of special interest because of their unusual electronic and optical properties, and because of their possible application as electron transporting materials in devices. They are also of interest due to their high-energy band-gap as compared to the simple metallole derivatives. This feature allows for the detection of explosives that do not have good energy overlap with simple metallole polymers.

Typically, polymetalloles and polymetallofluorenes have a Si—Si, Ge—Ge, or Si—Ge backbone encapsulated by the highly conjugated unsaturated five-membered ring systems as side chains. These polymers are highly photoluminscent, and are accordingly useful as light emitting diodes (LEDs) and as chemical sensors. However, optimized synthetic approaches, including Wurtz-coupling and dehydrogenative coupling, produce only short chain oligomers for metalloles while creating cyclic hexameric complexes for metallofluorenes. The Si—Si backbone also creates a fragile framework.

A copolymer of a polymetallofluorene and polyacetylene polymer (PSFA) provides both high molecular weight polymers by catalytic hydrosilation, which prevents formation of cyclic complexes. It also provides a stronger Si—C backbone, increasing the stability of this copolymer in solution and the solid state. Characteristic features of PSFA include a low reduction potential and a low-lying lowest unoccupied molecular orbital (LUMO) due $\sigma^*$-$\pi^*$ conjugation arising from the interaction between the $\sigma^*$ orbital of silicon or germanium and the $\pi^*$ orbital of the butadiene moiety of the five-membered ring. However, a wide band-gap provides good overlap between the excited-state LUMO of the copolymer and the LUMO of the highly electron deficient explosive material. In addition, the conjugated backbone exhibits moderate delocalization, which further delocalizes the conjugated metalloleftluorene $\pi$ electrons along the backbone. Electron delocalization in these polymers provides a means of amplification, because interaction between an analyte molecule at any position along the polymer chain is communicated throughout the delocalized chain.

Embodiments of the present invention provide a rapid, low cost, highly sensitive method of detection for a range of explosive materials including nitroaromatic-, nitrate ester-, and nitramine-based explosives. In one exemplary method, a sampling substrate is exposed to a single detection reagent to determine the presence and amount of various solid explosive particulates. While the sampling substrate may be separate from the surface suspected of being contaminated with the target explosive, i.e., a substrate exposed to a potentially contaminated surface, the sampling substrate may also include the contaminated surface itself. One exemplary sampling substrate is filter paper that is contacted with, or otherwise exposed to, the contaminated surface.

Additional embodiments and features will be apparent to artisans with reference to experiments that have been conducted. The experiments showed that during the detection process, extremely small amounts of nitroaromatic-based, nitramine-based and nitrate ester-based explosives can be detected. For example, amounts that were approximately 1 ng, 6 ng and 6 ng, respectively were detected in experiments. The types of explosives that were detected in experiments include trace residues of picric acid (PA, 2,4,6-trinitrophenol, $C_6H_2(NO_2)_3OH$), 2,4-dinitrotoluene (DNT, $C_7H_6N_2O_4$) and 2,4,6-trinitrotoluene (TNT, $C_7H_5N_3O_6$). Nitramine-based explosives detected in experiments include cyclotrimethylenetrinitramine (RDX, $C_3H_6N_6O_6$), cyclotetramethylene-tetranitramine (HMX, $C_4H_8N_8O_8$) and 2,4,6-trinitrophenyl-N-methylnitramine (Tetryl, $C_7H_5N_5O_8$). Nitrate ester-based explosives detected in experiments include pentaerythritol tetranitrate (PETN, $C_5H_8N_4O_{12}$) and trinitroglycerin (TNG, $C_3H_5N_3O_9$).

A preferred method of detection is carried out by exposing a sampling substrate to a reagent of PSFA. Based on experimental results, it is predicted that PSFA may be placed in one of a variety of volatile organic solvents. One exemplary reagent includes a 1 mg/mL solution of PSFA in a 9:1 acetone:toluene solvent. Prior to use, the reagent is preferably stored in a container that inhibits photodegrdation, such as an amber vial or dark environment to preserve the copolymer from possible photodegradation. A preferred embodiment is a test kit that includes PSFA stored in such a container and a plurality of testing substrates. Other embodiments include a substrate pre-treated with PSFA. When the substrates are pre-treated, sensitivity is reduced. Intimate mixing of PSFA and analyte, such as is achieved through spraying of otherwise coating PSFA onto a substrate that has been exposed to analyte, is required to achieve low detection limits. More generally, blue-photoluminescent silafluorene copolymers can be used in preferred sensing methods and sensors of the invention.

In preferred detection methods, PSFA is sprayed on or otherwise deposited on a sampling surface that has been exposed to analyte. In a preferred method, the reagent is sprayed onto the sample substrate at volumetric flow rate of approximately 0.5 mL/s. The sampling substrate and PSFA are then stimulated, electrically or with an appropriate wavelength of light, such as 302 nm, with a UV-B (302 nm) or UV-C (254 nm) blacklight, LED, or other illumination source. Detection of nitrogen-containing explosives can be confirmed by visually or instrumentally (e.g. with a U.V. or visible CCD camera, or a fluorimeter) detecting fluorescence quenching (at 370-430 nm) of the copolymer by the analyte (e.g., TNT, RDX and PETN). Advantageously, detection is selective for strongly oxidizing explosive materials.

Embodiments of the instant invention are especially advantageous in providing a single polymer for the fluorimetric detection of a range of common nitrogen containing explosives including nitroaromatic (e.g. TNT), nitrate ester (e.g. PETN) and nitramine-based explosives (e.g. RDX). Particular preferred embodiment sensors, sensor systems and methods utilize the high energy of the excited state in the blue luminescence of polymers PSF1 1-3, which offer an increased driving force for electron transfer to the explosive analyte and improved detection limits by electron transfer quenching. These preferred copolymers provide high quantum efficiencies (25-100%±30%) for photoluminescence that help to lower detection limits through enhanced visualization. These preferred copolymers also require less material to be used to achieve results similar to polymers with low quantum yields.

Characteristic features of PSF1 1-3 include a low reduction potential and a low-lying lowest unoccupied molecular orbital (LUMO) due $\sigma^*$-$\pi^*$ conjugation arising from the interaction between the $\sigma^*$ orbital of silicon and the $\pi^*$ orbital of the butadiene moiety of the five-membered ring. However, a wide band-gap provides good overlap between the excited-state LUMO of the polymer and the LUMO of the highly electron deficient explosive material. In addition, the conjugated backbone exhibits moderate delocalization, which further delocalizes the conjugated metallofluorene $\pi$-electrons along the backbone. Electron delocalization in these polymers provides a means of amplification, because interaction between an analyte molecule at any position along the polymer chain is communicated throughout the delocalized chain.

The porosity created by the spirobifluorene containing polymer blocks in PSF1-3 creates cavities for facile analyte binding. Detection is carried out in a one-step fluorescence quenching mechanism. Embodiments of the invention are particularly advantageous in that they provide sensitive, rapid, and low cost detection of a wide range of trace explosives on a variety of surfaces, including, for example, bomb makers' hands, clothing, hair, dwellings, packages, cars, and door knobs to their houses.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

PFSA

In preferred methods, detection of the nitrogen-containing explosives can be accomplished by measurement of the quenching of photoluminescence of PSFA, preferably a vinyl bridged silafluorene copolymer, by the analyte. Sensitivity of PSFA to the analytes picric acid, TNT and DNT is as follows: TNT>PA>DNT. Sensitivity of PSFA to the analytes RDX, HMX and Tetryl is as follows: Tetryl>RDX>HMX. Sensitivity of PSFA to the analytes TNG and PETN are as follows: PETN>TNG. Experimentally determined detection limits for sensing using a 254 nm backlight are summarized in Table 1.

TABLE 1

Table of detection limits (ng) for various explosives when spotted on filter paper.

| Explosive | Excitation Wavelength | |
|---|---|---|
| | 360 nm | 254 nm |
| TNT | 6 | 1 |
| DNT | 50 | 8 |
| PA | 10 | 6 |
| RDX | 50 | 6 |
| HMX | 100 | 10 |
| Tetryl | 6 | 0.6 |
| TNG | NA | 10 |
| PETN | 50 | 6 |

The detection limits in Table 1 were obtained with use of a 254 nm blacklight. Explosives detection data was obtained using a double blind test where the detection limit was set at the lowest concentration of analyte that could be detected with >90% accuracy by an observer. Excitation can be achieved with either electrical or optical stimulation. If optical stimulation is used, a light source containing energy that is larger than the wavelength of luminescence emission of the copolymer is preferably used. This could be achieved with, for example, a mercury lamp, a blue light emitting diode, or an ultraviolet light emitting diode. For electrical stimulation, the PSFA would be used as the emitting layer in an organic light emitting diode (OLED) multilayer device.

Figure 1:
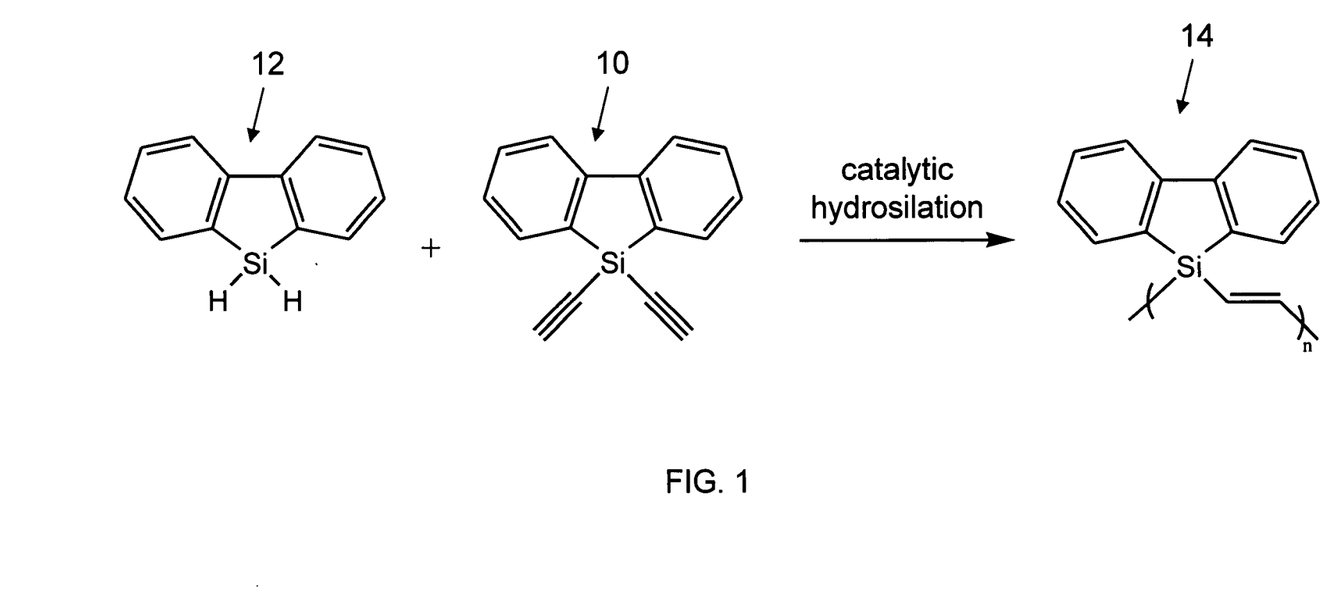
FIG. 1 illustrates a method of synthesis of a vinyl bridged metallofluorene copolymer (PSFA) according to an embodiment of the invention.

FIG. 1 illustrates a preferred method for the synthesis of PSFA. The method shown in FIG. 1 is the catalytic hydrosilation of diethynylmetallofluorene 10 and dihydrosilafluorene 12 to produce PSFA 14. This approach gives a highly regular copolymer in good yield (ca. 65-80%) using 0.1-0.5 mol % of $H_2PtCl_6 \cdot xH_2O$ for hydrosilation. This heterogeneous catalyst is commercially available and can be easily removed from the product.

Figure 2:
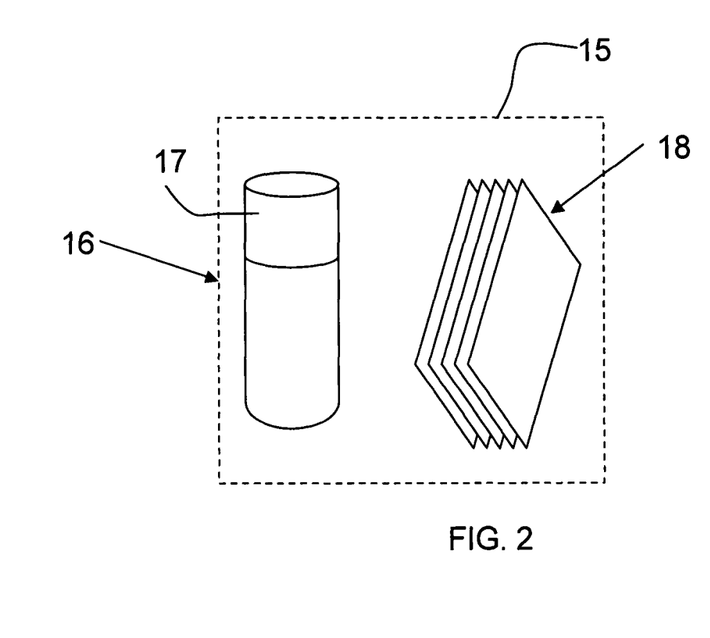
FIG. 2 schematically illustrates an explosives test kit of the invention.

FIG. 2 shows a test kit 15 that includes a container 16 that inhibits photodegradation, such as an amber vial or dark environment to preserve PSFA copolymer from possible photodegredation. In other embodiments, the container contains another blue-photoluminescent silafluorene copolymer. The container 16 has a removable lid 17 or other structure that can be opened, and can also include an applicator such as a spray nozzle, roller or the like. The test kit also includes a plurality of testing substrates 18, for example filter paper. The test kit is used to test, via photoluminescence quenching, for nitrogen containing explosives by exposing a substrate to a suspected environment, substance or structure. Copolymer is then applied and excited to luminescence. Observation of quenching is an indication of the presence of a nitrogen containing explosive.

Figure 3:
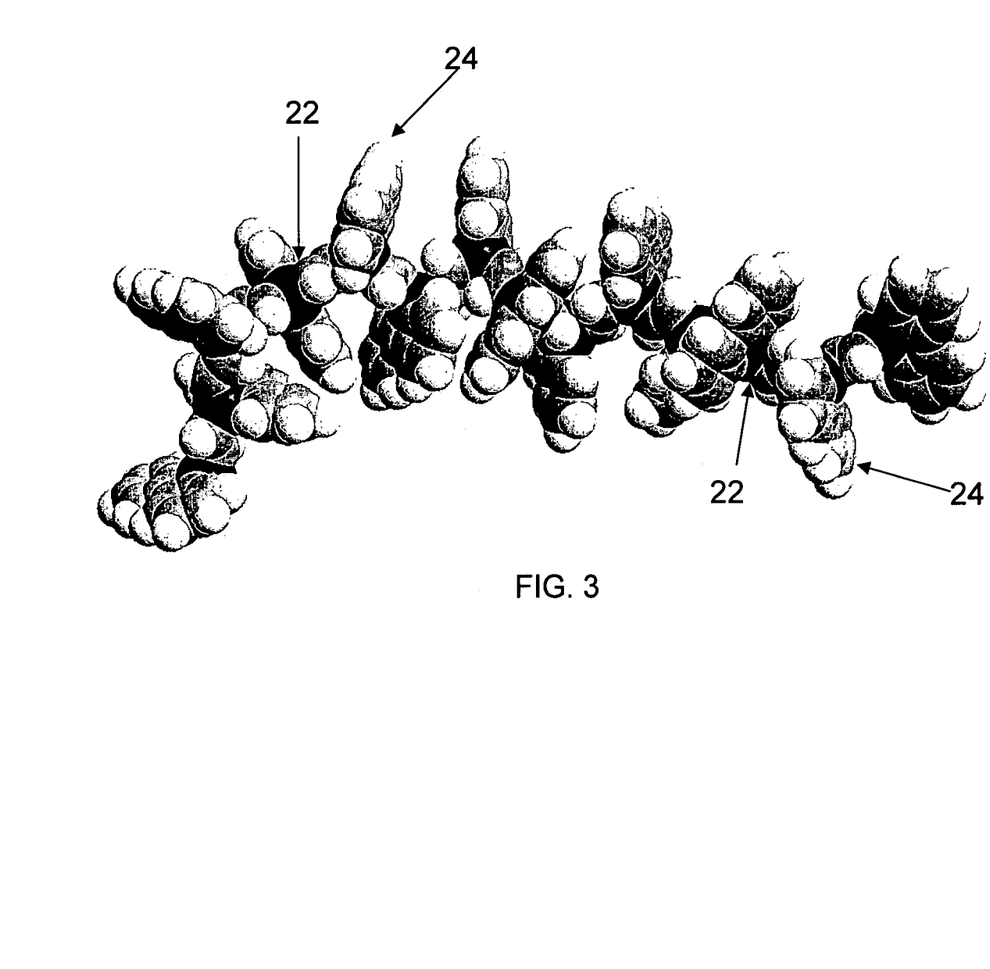
FIG. 3 illustrates a space-filling model of PSFA.

By $^1H$ NMR spectroscopy, the monomers, diethynylmetallofluorene and dihydrometallofluorene, were completely consumed in the reaction. Molecular weights ($M_w$) of $1.5 \times 10^4 \sim 2.0 \times 10^4$ are obtained. FIG. 3 illustrates a space filling model structure of PSFA, which features a Si—C backbone 22 inside a conjugated ring system 24 of side chains closely packed to yield a helical arrangement. The molecular weights and polydisperity indices (PDI) of PSFA were determined by $^1H$ NMR and gel permeation chromatography (GPC), respectively.

Absorption and Fluorescence

Figure 4:
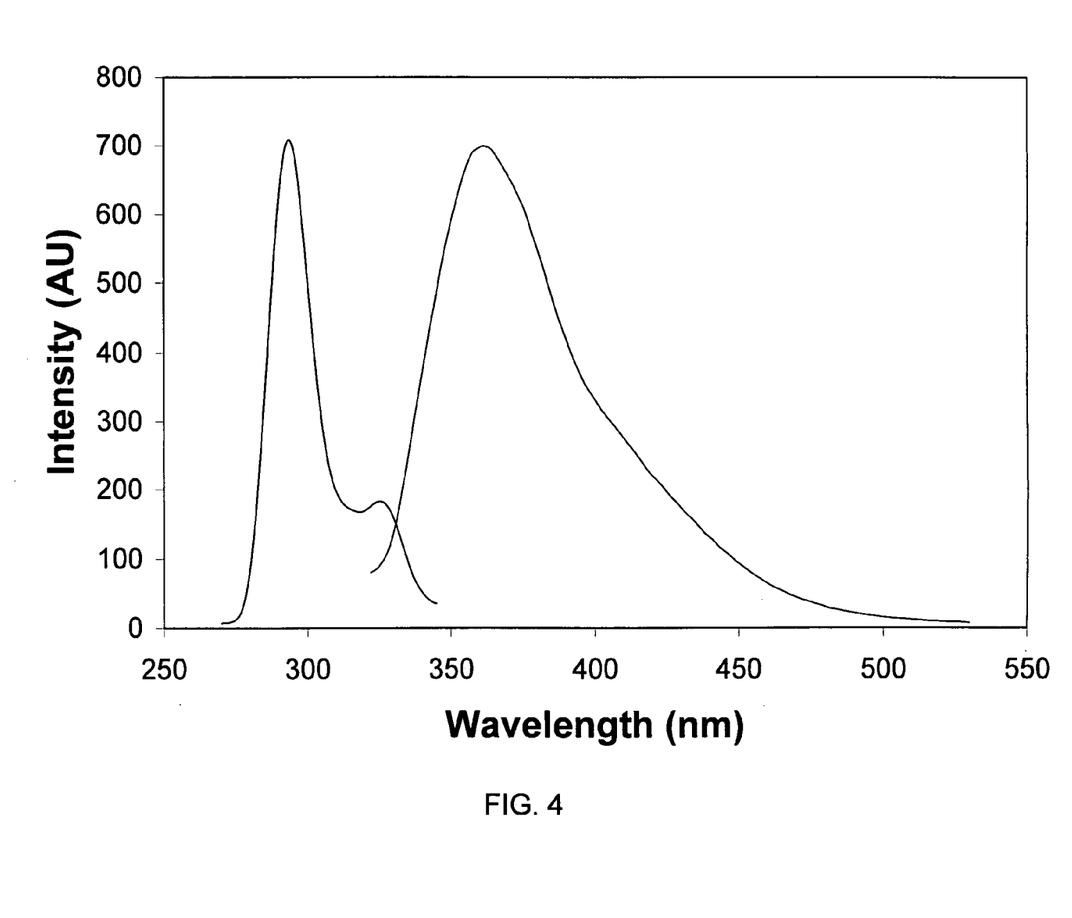
FIG. 4 shows photoluminescence spectra of PSFA.

The UV-vis absorption and fluorescence spectral data for PSFA are illustrated in FIG. 4. PSFA exhibits one absorption band, which is ascribed to the $\pi$-$\pi$* transition in the metallofluorene ring. PSFA exhibits one fluorescence emission band with a shoulder that tails into the visible spectrum.

The fluorescence spectrum of PSFA is red-shifted approximately 20 nm from the dihydrosilafluorene and diethynylsilafluorene monomers. This red shift is attributed to an increasing main chain length and partial conjugation between silafluorene units.

Fluorescence Quenching with Nitroaromatic Analytes

Photoluminescence quenching arises from the interaction of the PSFA with analyte in thin-film. Brief solvation of the analyte upon application of PSFA allows for mixing of the copolymer with the explosive material. Nitroaromatic explosive analytes may participate in a static quenching process through $\pi$-stacking interactions with the aromatic features of PSFA, thereby resulting in a slightly lower detection limit. Optical excitation produces an electron-hole pair, which is delocalized through the PSFA framework. When an electron deficient molecule, such as TNT or RDX is present, electron-transfer quenching occurs from the excited metallofluorene copolymer to the LUMO of the analyte. The copolymer-quencher complex luminescence intensity depends on the electron acceptor ability of the quencher as well as the van der Waals' interactions of the analyte with the copolymer.

Insensitivity of PSFA to Inteferents

An important aspect of the PSFA is its relative insensitivity to common interferents. Control experiments using both solutions and thin films of PSFA (deposited on Whatman® filter paper) with air displayed no change in the photoluminescence spectrum. Similarly, exposure of metallofluorene-acetylene copolymers both as solutions and as thin films to organic solvents such as toluene, THF, and methanol produced no significant decrease in photoluminescence intensity.

In the experiments that were conducted, Benzophenone was the only common intereferent found to be detected by PSFA. This result is understandable considering the electron accepting ability and the aromatic structure of this interferent. These results indicate that PSFA exhibits less response to interferences and greater response to nitroaromatic compounds compared to other fluorescent polymer sensors.

Experiment Preparation and Data Collection Details

All synthetic manipulations were carried out under an atmosphere of dry dinitrogen gas using standard vacuum-line Schlenk techniques. All solvents were degassed and purified prior to use according to standard literature methods: diethyl ether, hexanes, tetrahydrofuran, and toluene purchased from Aldrich Chemical Co. Inc. were distilled from sodium/benzophenone ketal or passed through a MBraun solvent purification system under an ultra high purity nitrogen atmosphere. Spectroscopic grade of is toluene from Fisher Scientific was used for the fluorescent measurement. NMR grade deuterochloroform was stored over 4 Å molecular sieves. All other reagents (Aldrich) were used as received or distilled prior to use.

NMR data were collected with Varian Unity 300, 400, or 500 MHz spectrometers (300.1 MHz for $^1$H NMR, 75.5 MHz for $^{13}$C NMR and 99.2 MHz for $^{29}$Si NMR) and all NMR chemical shifts are reported in parts per million ($\delta$ ppm); downfield shifts are reported as positive values from tetramethylsilane (TMS) as standard at 0.00 ppm. The $^1$H and $^{13}$C chemical shifts are reported relative to $CHCl_3$ ($\delta$ 77.0 ppm) as an internal standard, and the $^{29}$Si chemical shifts are reported relative to an external TMS standard. NMR spectra were recorded using samples dissolved in $CDCl_3$, unless otherwise stated, on the following instrumentation.

$^{13}$C NMR were recorded as proton decoupled spectra, and $^{29}$Si NMR were recorded using an inverse gate pulse sequence with a relaxation delay of 30 seconds. The molecular weight and PDI were measured by $^1$H NMR and gel permeation chromatography respectively using a Waters Associates Model 6000A liquid chromatograph equipped with three American Polymer Standards Corp. Ultrastyragel columns in series with porosity indices of 103, 104, and 105 Å, using freshly distilled THF as eluent. Fluorescence emission and excitation spectra were recorded on a Perkin-Elmer Luminescence Spectrometer LS 50B. 1,1-dichlorosilafluorene and 1,1-dihydrosilafluorene were synthesized by following the procedures described in the literature. All reactions were performed under an Ar atmosphere.

Preparation of 1,1-diethynylsilafluorene: 1,1-dichlorosilafluorene (1.0 g, 4.0 mmol) was placed in 70 mL dry THF. Ethynylmagnesium bromide in THF (16 mL, 8 mmol) was slowly syringed into the reaction flask. The solution was stirred at room temperature for 2 hrs. The light brown solution was filtered and evaporated to dryness. The light brown solid was purified by sublimation (90-110° C., 0.2 Torr) to yield 640 mg (70%) of a white crystalline is solid. Selected data; $^1$H NMR (300.134 MHz, CDCl3): $\delta$=7.80 (dd, 4H, Ph-H), 7.50 (td, 2H, Ph-H), 7.35 (td, 2H, Ph-H); 2.60 (s, 2H, C≡C—H); $^{29}$Si NMR (71.548 MHz, inversed gated decoupling, CDCl3): $\delta$=−51.2 (s, silafluorene).

Preparation of PSFA: 1,1-diethynylsilafluorene (100 mg, 0.4 mmol), 1,1-dihydrosilafluorene (79 mg, 0.4 mmol) and 0.5 mol % $H_2PtCl_6 \cdot xH_2O$ were stirred in dry toluene (1 mL) at 100° C. for 24 h. The orange-brown solution was filtered while warm and evaporated to dryness. The remaining solid was dissolved in 1 mL of THF and precipitated with the addition of 15 mL of methanol. The resulting light white solid was collected by vacuum filtration (0.101 g, 56%). Selected data; $^1$H NMR (300.134 MHz, CDCl3): $\delta$=7.9-6.5 (br. 10H, Ph-H and C=C—H), 2.61 (s, 2H, terminal C≡C—H); $^{29}$Si NMR (71.548 MHz, inversed gated decoupling, CDCl3): $\delta$=6 ppm (s, silafluorene); $^1$H NMR: $M_w$=1.9×10$^4$ determined by ratio of phenyl protons to terminal ethynyl protons; GPC: Mw/Mn=1.37, determined by SEC with polystyrene standards; UV (conc. =10 mg/L); $\lambda_{abs}$=292 nm; Fluorescence; $\lambda_{em}$=361 nm at $\lambda_{ex}$=293 nm.

Explosive Detection Experimental Results and Data

The method of explosives detection is through luminescence quenching of the metallofluorene-containing copolymer by the explosive analyte. Eight common explosives were tested, trinitrotoluene (TNT), 2,4-dinitrotoluene (DNT), picric acid (PA), cyclotrimethylenetrinitramine (RDX), cyclotetramethylene-tetranitramine (HMX), 2,4,6-trinitrophenyl-N-methylnitramine (Tetryl), pentaerythritol tetranitrate (PETN), and trinitroglycerin (TNG). Stock solutions of the explosives were prepared in toluene. Aliquots (1-5 µL) of the stock (containing 5 to 100 ng analyte) were syringed onto Whatman® filter paper and allowed to dry completely. The spots were between 3 and 10 mm in diameter, producing a surface concentration of not more than 64 ng/cm$^2$ and not less than 17 ng/cm$^2$. Solutions of the polymers (0.5-1% w:v) were prepared in 9:1 acetone:toluene. A thin film of a copolymer was applied to the substrate by spray coating a polymeric solution onto the substrate and air drying. The coated substrates were placed under a black light to excite the copolymer fluorescence. Dark spots in the film indicate luminescence quenching of the copolymer by the analyte. The process was carried out for each of the eight explosive analytes.

The experiments show that nitrogen containing explosives may be visually detected in nanogram quantities by fluorescence quenching of photoluminescent silafluorene based copolymers. Detection limits depend on the explosive analyte. Illumination with a black light ($\lambda_{em}$~302 nm) excites the copolymer fluorescence near 360-430 nm. Spots were clearly visible to human observation and can be imaged as was shown by taken photographs. Since the spots can be readily photographed, the observation of quenching can also be conducted electronically, for example by image analysis software that searches for the dark spots or lack of uniformity in the luminescence of the copolymer. The observation of spots clearly indicated the luminescence quenching of PSFA by 200, 100, 50, and 10 ng of Tetryl, TNT, RDX, and PETN on Whatman® filter paper. Luminescence quenching is observed immediately upon illumination. PSFA is photodegradable if left in ambient light more than two weeks. However, luminescence will remain in the solid state thin films for days. These polymers present an inexpensive and simple method to detect low nanogram level of nitroaromatic explosives.

Preferred synthesis methods, as with PSFA described above involve providing precursors of the form diethynyl-x-fluorene and dihydrosilafluorene and then conducting catalytic hydrosilation of the precursors. The form of "x" is different in the synthesis of different ones of the copolymers. PSF1 1-3

Additional embodiments of the invention are based upon preferred PSF1 1-3 copolymers. Embodiments of the present invention provide a rapid, low cost, highly sensitive method of detection for a range of explosive materials including nitroaromatic-, nitrate ester-, and nitramine-based explosives. For PSF1-1, the unprotected bridging methylene group can be oxidized when exposed to UV light. The rate of this photooxidation can be altered by non-conjugated peroxides as well as nitrate ester-based explosives and used for selective detection of explosive classes. In the first example, the peroxides act as a radical scavenger to prevent oxidation of the methylene group. When visualized under a UV lamp, a polymer spot containing these peroxides will remain bright blue, while the rest of the polymer fades to a dull green color by air photo-oxidation in air. This method is of particular interest for the detection of the high explosives TATP and HMTD. In the second example, the nitrate ester and to a lesser extent the nitramine functionalities accelerate the photo-oxidation process. When visualized under a UV-lamp, these spots will first quench the luminescence of the polymer, creating a dark spot and confirming their presence. Upon further exposure to the UV light, the spots will turn a pale luminescent green-yellow, allowing for specific identification of the presence of a nitrate ester-based explosive. Nitrate ester based explosives can be confirmed at the same detection limit seen in the fluorescence quenching process. Nitramine based explosives also react and can be confirmed by the green-yellow luminescence at levels 50-100 ng greater than their detection limit by fluorescence quenching. In one exemplary method, a sampling substrate is exposed to a single detection reagent to determine the presence and amount of various solid explosive particulates. While the sampling substrate may be separate from the surface suspected of being contaminated with the target explosive, i.e., a substrate exposed to a potentially contaminated surface, the sampling substrate may also include the contaminated surface itself. One exemplary sampling substrate is filter paper that is contacted with, or otherwise exposed to, the contaminated surface. During example detection processes that were tested experimentally, extremely small amounts of nitroaromatic-based, nitramine-based and nitrate ester-based explosives, approximately 40 pg, 6 ng and 1 ng, respectively, were detected. Embodiments of the invention with PSF1 1-3 polymers enable detection of a wide variety of explosives. Nitroaromatic-based explosives detected in experiments include trace residues of picric acid (PA, 2,4,6-trinitrophenol, $C_6H_2(NO_2)_3OH$), 2,4-dinitrotoluene (DNT, $C_7H_6N_2O_4$), 2,4,6-trinitrotoluene (TNT, $C_7H_5N_3O_6$) and 2,4,6-trinitrophenyl-N-methylnitramine (Tetryl, $C_7H_5N_5O_8$). Nitramine-based explosives detected include cyclotrimethylenetrinitramine (RDX, $C_3H_6N_6O_6$) and cyclotetramethylene-tetranitramine (HMX, $C_4H_8N_8O_8$). Nitrate ester-based explosives detected include pentaerythritol tetranitrate (PETN, $C_5H_8N_4O_{12}$) and trinitroglycerin (TNG, $C_3H_5N_3O_9$). Dicumyl peroxide (DC, $C_{18}H_{21}O_2$) and di-t-butylperoxide (TBP, $C_8H_{18}O_2$) were used to simulate triacetone triperoxide (TATP, $C_9H_{18}O_6$) and hexamethylene triperoxide diamine (HMTD, $C_6H_{12}N_2O_6$).

In experiments, detection was carried out by exposing a sampling substrate to a reagent of one of the polymers PSF1 1-3. Based on experimental results, the polymers PSF1 1-3 can be placed in one of a variety of volatile organic solvents. One exemplary reagent includes a 0.05 mg/mL solution of PSF1-1 in a 9:1 acetone:toluene solvent. Prior to use with embodiments of the invention, the reagent is preferably stored in an amber vial or dark environment to preserve the polymer from possible photo-degradation. Other volatile solvents, high-energy luminescent metallofluorene polymers and concentrations can be used in additional preferred methods.

In example methods, a polymer of PSF1 1-3 is sprayed on or otherwise deposited on a sampling surface. In a preferred method, the reagent is sprayed onto the sample substrate at volumetric flow rate of approximately 0.5 mL/s. The sampling substrate and PSF1 1-3 polymer are then excited at an appropriate wavelength, such as 302 nm, with a UV-B (302 nm) or UV-C (254 nm) blacklight, LED, or other illumination source. Detection of nitrogen-containing explosives is confirmed by visually or instrumentally (e.g. with a U.V. or visible CCD camera, or a fluorimeter) detecting fluorescence quenching (at 370-550 nm) of the polymer by the analyte (e.g., TNT, RDX and PETN). Advantageously, detection is selective for more strongly oxidizing explosive materials. For polymer PSF1-1 only, further exposure to UV-light will facilitate photo-oxidation of the polymer. The presence of a nitrate ester-based explosive is confirmed by the appearance of a green-yellow luminescence on the previously dark spot created by the initial fluorescence quenching event. This provides selectivity for detection of PETN and TNG. The presence of non-conjugated peroxides, such as dicumyl peroxide and di-t-butylperoxide, is confirmed by the remnants of a bright blue luminescence after the surrounding polymer fades to a dull green luminescence. These peroxides act as radical stabilizers, preventing the rapid photo-oxidation of the polymer. Other peroxide-based explosive such as TATP and HMTD can be detected in a similar manner.

Detection of Nitrogen-Containing Explosive Compounds

Detection of the nitrogen-containing explosives can be accomplished by measurement of the quenching of photoluminescence of silafluorene copolymers by the analyte. Sensitivity of PSF1 1-3 to the analytes picric acid, TNT, DNT, and Tetryl is as follows: Tetryl>TNT>PA>DNT. Sensitivity of PSF1 1-3 to the analytes RDX and HMX is as follows: RDX≈HMX. Sensitivity of PSF1 1-3 to the analytes TNG and PETN are as follows: PETN>TNG. Detection limits are summarized in the Table 2.

Table 2 shows detection limits (ng) for various explosives when spotted on filter paper, coated with PSF1-1, FSF1-2, or PSF1-3 and illuminated under UV light to visualize. Detection limits based on double-blind confirmation of fluorescence quenching. Dashed line represents no detection at 200 ng level.

TABLE 2

| Analyte | PSFI-1 | PSFI-2 | PSFI-3 |
|---|---|---|---|
| Tetryl | 0.04 | 0.08 | 0.08 |
| TNT | 0.1 | 0.2 | 0.1 |
| picric acid | 2 | 1 | 0.4 |
| DNT | 0.6 | 0.8 | 0.8 |
| PETN[†] | 1 | 2 | 1 |
| RDX | 6 | 6 | 6 |
| HMX | 8 | 8 | 6 |
| TNG[†] | 4 | 6 | 8 |
| dicumyl peroxide[‡] | 10 | — | — |
| di-t-butylperoxide[‡] | 100 | — | — |

[†]Detection limit based on fluorescence quenching and confirmed by green-yellow turn-on fluorescence.
[‡]Detection limit based on blue fluorescence spot remaining after 1 min exposure to UV light.

Detection limits are based on the use of a 302 nm lamp (UVP Sterilaire XX-15 m UV lamp, Fisher) equipped with a UV-transmitting filter (U-340, HOYA Optics). Explosives detection data was obtained using a double blind test where the detection limit was set at the lowest concentration of analyte that could be detected with >90% accuracy by an independent observer. Excitation can be achieved with electrical or optical stimulation. If optical stimulation is used, a light source containing energy that is larger than the wavelength of luminescence emission of the polymer is preferably used. This could be achieved with, for example, a mercury lamp, a blue light emitting diode, or an ultraviolet light emitting diode.

Figure 5A:
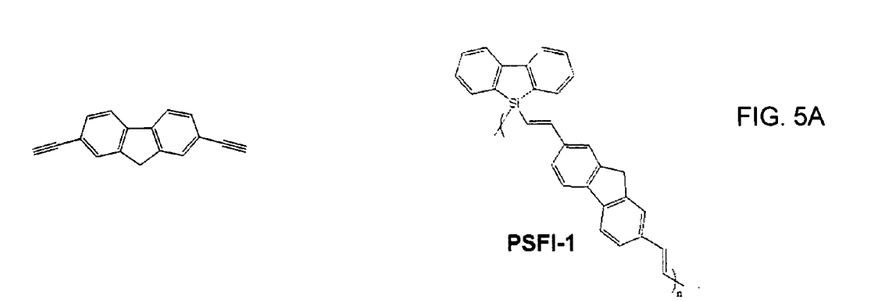
FIGS. 5A-5C illustrates a method for the synthesis of additional vinyl bridged metallofluorene copolymers of the invention, labeled PSF1-1, PSF1-2, and PSF1-3.
Figure 5B:
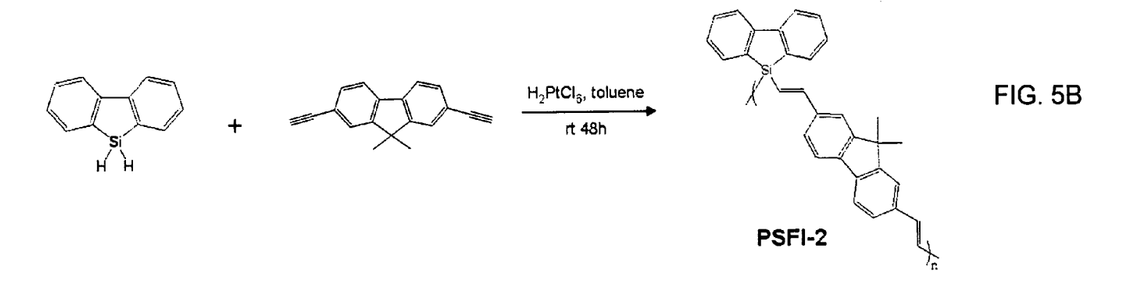
Figure 5C:
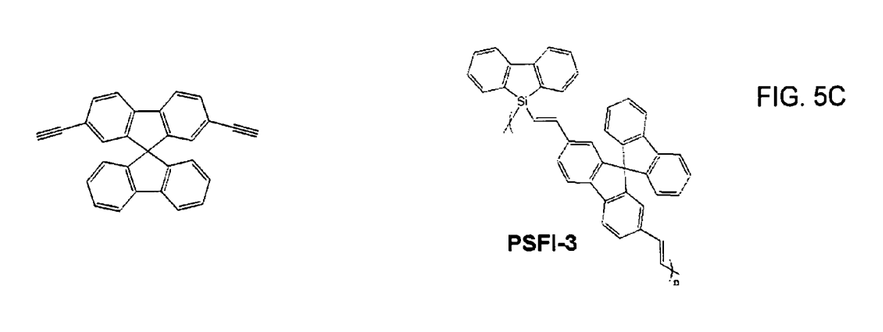
Figure 6:
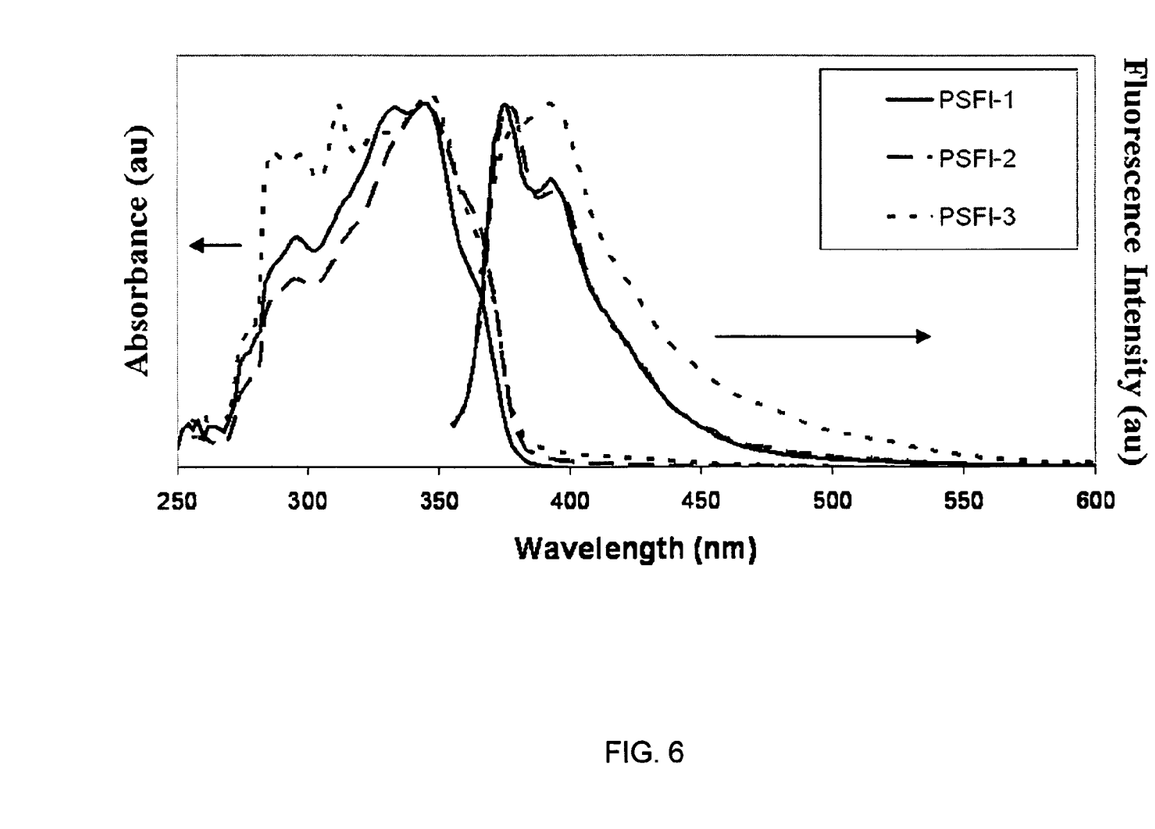
FIG. 6 shows the photoluminescence spectra of PSF1-1, PSF1-2, and PSF1-3.

FIGS. 5A-5C illustrate the synthesis of the preferred polymers PSF1 1-3. Embodiments of the instant invention include methods for synthesizing PSF1 1-3 that uses catalytic hydrosilylation of appropriately functionalized 2,7-diethynylfluorenes and 1,1-dihydrosilafluorene. This approach gives a highly regular polymers in good yield (ca. 80-95%) using 0.1-0.5 mol % of $H_2PtCl_6.xH_2O$. This heterogeneous catalyst is commercially available and can be easily removed from the product. By $^1H$ NMR spectroscopy, the monomers, diethynylfluorene and dihydrosilafluorene, were completely consumed in the reaction. Molecular weights ($M_W$) of $1.3 \times 10^4$ ~$2.0 \times 10^4$ are obtained. The molecular weights and polydisperity indices (PDI) of PSFA were determined by gel permeation chromatography (GPC).

Absorption and Fluorescence

The UV-vis absorption and fluorescence spectral data for polymers PSF1 1-3 are illustrated in FIG. 3. PSF1-1 and PSF1-2 exhibit similar is UV-vis and fluorescence emission bands with a shoulder that tails into the visible spectrum. The fluorescence spectrum of PSF1-3 is red-shifted approximately 25 nm from PSF1-1 and PSF1-2. All three polymers are red-shifted approximately 20 nm from monomeric 1,1-dihydridosilafluorene. This red shift is attributed to an increasing main chain length and partial conjugation between silafluorene and fluorene units.

Fluorescence Quenching with Nitroaromatic Analytes

Photoluminescence quenching arises from the interaction of PSF1 1-3 with the analyte in the thin-film. Brief solvation of the analyte upon application of PSF1 1-3 aerosol spray allows for mixing of the polymer with the explosive material. While the particular mechanism of quenching does not limit the invention, by way of explanation nitro and nitrate functionalities are believed participate in a Lewis acid/base interaction with the strained silacycle silicon center. This interaction can be enhanced both by the porosity of the polymer and the Lewis basicity of the explosive analyte. A static quenching process through π-stacking interactions of nitroaromatic explosives with the aromatic features of polymers PSF1 1-3 may also assist in tighter binding and enhanced detection for these explosives. Optical excitation produces an electron-hole pair, which is delocalized through the polymer framework. When an electron deficient molecule, such as TNT or RDX is present, electron-transfer quenching occurs from the excited silafluorene-fluorene copolymer to the LUMO of the analyte. The polymer-quencher complex luminescence intensity depends greatly on the electron acceptor ability of the quencher. Nitroaromatic explosives have lower energy LUMO's than nitrate ester or nitramine-based explosives and can be detected at lower detection limits.

PSF1-1 incorporates a fluorene unit that is unsubstituted in the 9 position. This leaves it susceptible to rapid oxidation when exposed to an energy source such as heat, electrical current or UV-light. Radical scavengers such as peroxides can prevent or slow down this oxidation process. For example, peroxide was detected by preventing oxidation of PSF1-1 under UV light. A spot containing the peroxide remained bright blue under the UV lamp while the rest of the polymer coated surface faded to a dull green luminescence as photo-oxidation occurred. The dicumyl peroxide was detected at a limit of 10 ng and di-t-butyl peroxide at 100 ng. Shock sensitive improvised peroxide explosives, such as TATP and HMTD, are expected to undergo detection in a similar way. While peroxides work to prevent oxidation through radical scavenging, nitrate ester-based explosives act to increase the rate of oxidation. Initial detection limits for nitrate ester explosives PETN and TNG are based on a fluorescence quenching mechanism. However, when exposed to UV-light for approximately 30 s, the dark spot turns to a green-yellow fluorescence. This fluorescing spot on prolonged UV irradiation confirms the presence of nitrate ester-based explosives. The ability of these different classes of explosives to alter the secondary rate of photo-oxidation gives such sensors of the invention a unique selectivity component in the detection process.

An important aspect of these silafluorene-fluorene polymers is their relative insensitivity to common interferents. Control experiments using both solutions and thin films of PSF1 1-3 (deposited on Whatman® filter paper) with air displayed no change in the photoluminescence spectrum.

PSF1-1 will photo-oxidize on continued UV exposure, but PSF1-2 and PSF1-3 do not. Similarly, exposure of the three silafluorene-divinylfluorenyl copolymers both as solutions and as thin films to organic solvents such as toluene, THF, and methanol produced no significant decrease in photoluminescence intensity. Highly conjugated organic electron acceptors, such as benzophenone and benzoquinone, were the only common interferents found to be detected by PSF1 1-3. This result is understandable considering the oxidizing ability and the aromatic structure of this interferent. These results indicate that polymers PSF1 1-3 exhibits less response to interferences and greater response to nitroaromatic, nitrate ester, and nitramine explosive compounds compared to other fluorescent polymer sensors.

Preparation of Explosives Detecting SilaFLUORENE-Containing Polymer

All synthetic manipulations were carried out under an atmosphere of dry dinitrogen gas using standard vacuum-line Schlenk techniques. All solvents were used directly from an MBraun solvent purification system. Spectroscopic grade toluene from Fisher Scientific was used for the fluorescent measurements. NMR grade deuteriochloroform was stored over 4 Å molecular sieves. All other reagents (Aldrich) were used as received or distilled prior to use. NMR data were collected with Varian Unity 300, 400, or 500 MHz spectrometers (300.1 MHz for $^{1}$H NMR, 75.5 MHz for $^{13}$C NMR and 99.2 MHz for $^{29}$Si NMR) and all NMR chemical shifts are reported in parts per million (δppm); downfield shifts are reported as positive values from tetramethylsilane (TMS) as standard at 0.00 ppm. The $^{1}$H and $^{13}$C chemical shifts are reported relative to $CHCl_3$ (δ77.0 ppm) as an internal standard, and the $^{29}$Si chemical shifts are reported relative to an external TMS standard. NMR spectra were recorded using samples dissolved in $CDCl_3$, unless otherwise stated, on the following instrumentation. $^{13}$C NMR were recorded as proton decoupled spectra, and $^{29}$Si NMR were recorded using an inverse gate pulse sequence with a relaxation delay of 30 seconds. The molecular weight and PDI were measured by $^{1}$H NMR and gel permeation chromatography respectively using a Waters Associates Model 6000A liquid chromatograph equipped with three American Polymer Standards Corp. Ultrastyragel columns in series with porosity indices of 103, 104, and 105 Å, using freshly distilled THF as eluent. Fluorescence emission and excitation spectra were recorded on a Perkin-Elmer Luminescence Spectrometer LS 50B. Polymer precursors 2,7-diethynylfluorene, 9,9-dimethyl-2,7-diethynylfluorene, 2,7 diethynylspirobifluorene and 1,1-dihydrosilafluorene were synthesized by following the procedures described in the literature. All reactions were performed under an argon atmosphere.

Preparation of PSF1-1:

2,7-diethynylfluorene (118 mg, 0.5 mmol), 1,1-dihydrosilafluorene (100 mg, 0.5 mmol) and 0.5 mol % $H_2PtCl_6.xH_2O$ were stirred in dry toluene (5 mL) at room temperature for 48 h. To the light orange solution was added dimethylphenylsilane (0.1 mL, 0.7 mmol) and the mixture was stirred at room temperature for an additional 3 h. The solution was filtered and evaporated to dryness. The remaining solid was dissolved in 2 mL of THF and precipitated with the addition of 20 mL of methanol. The resulting light yellow solid was collected by vacuum filtration and washed with 5 mL of acetone to remove low molecular weight oligomers (0.153 g, 70%). Selected data; $^{1}$H NMR (300.134 MHz, CDCl3): δ=7.9 −6.5 (br. 18H, Ph-H and C═C—H), 3.87 (br-s, 2H, $CH_2$), 0.42 (s, 12H, terminal $CH_3$); GPC: $M_W$ =1.6 ×$10^4$, $M_w/M_n$ =2.6, determined by SEC with polystyrene standards; UV (conc. =10mg/L); $\lambda_{abs}$ =346 nm; Fluorescence; $\lambda_{em}$=376 nm at $\lambda_{ex}$=340 nm.

Preparation of PSF1-2: 9,9-dimethyl-2, 7-diethynylfluorene (133 mg, 0.5 mmol), 1,1-dihydrosilafluorene (100 mg, 0.5 mmol) and 0.5 mol % $H_2PtCl_6 \cdot xH_2O$ were stirred in dry toluene (5 mL) at room temperature for 48 h. To the light orange solution was added dimethylphenylsilane (0.1 mL, 0.7 mmol) and the mixture was stirred at room temperature for an additional 3 h. The solution was filtered and evaporated to dryness. The remaining solid was dissolved in 2 mL of THF and precipitated with the addition of 20 mL of methanol. The resulting yellow solid was collected by vacuum filtration and washed with 5 mL of acetone to remove low molecular weight oligomers (0.225 g, 96%). Selected data; $^1H$ NMR (300.134 MHz, CDCl3): $\delta$=7.9–6.5 (br. 18H, Ph-H and C=C—H), 0.45 (br-s, 6H, $CH_3$), 0.42 (s, 12H, terminal $CH_3$); GPC: $M_W$ =2.0×10$^4$, $M_w/M_n$ =2.3, determined by SEC with polystyrene standards; UV (conc. =10mg/L); $\lambda_{abs}$ =344 nm; Fluorescence; $\lambda_{em}$=377 nm at $\lambda_{ex}$=340 nm.

Preparation of PSF1-3:

2,7 diethynylspirobifluorene (207 mg, 0.5 mmol), 1,1-dihydrosilafluorene (100 mg, 0.5 mmol) and 0.5 mol % $H_2PtCl_6 \cdot xH_2O$ were stirred in dry toluene (7 mL) at 40° C. for 48 h. To the orange solution was added dimethylphenylsilane (0.1 mL, 0.7 mmol) and the mixture was stirred at 40° C. for an additional 3 h. The solution was filtered and evaporated to dryness. The remaining solid was dissolved in 2 mL of THF and precipitated with the addition of 20 mL of methanol. The resulting light yellow solid was collected by vacuum filtration and washed with 5 mL of acetone to remove low molecular weight oligomers (0.290 g, 94%). Selected data; $^1H$ NMR (300.134 MHz, CDCl3): $\delta$=7.9–6.0 (br. 26H, Ph-H and C=C—H), 0.33 (s, 12H, terminal $CH_3$); GPC: $M_w$ =1.4×10$^4$, $M_w/M_n$ =1.7, determined by SEC with polystyrene standards; UV (conc. =10mg/L); $\lambda_{abs}$ =346 nm; Fluorescence; $\lambda_{em}$=392 nm at $\lambda_{ex}$=345 nm.

Experimental Results and Data

The method of explosives detection is through luminescence quenching of the silafluorene-containing polymers by the explosive analyte. Eight common explosives were tested, Trinitrotoluene (TNT), 2,4-dinitrotoluene (DNT), picric acid (PA), cyclotrimethylenetrinitramine (RDX), cyclotetramethylene-tetranitramine (HMX), 2,4,6-trinitrophenyl-N-methylnitramine (Tetryl), pentaerythritol tetranitrate (PETN), and trinitroglycerin (TNG). Dicumyl peroxide and di-t-butylperoxide were tested as TATP and HMTD simulants. Stock solutions of the explosives were prepared in toluene. Aliquots (1-5 µL) of the stock solution (containing 100 pg to 100 ng analyte) were syringed onto Whatman® filter paper and allowed to dry completely. The spots were between 3 and 10 mm in diameter, producing a surface concentration of not more than 64 ng/cm$^2$ and not less than 17 ng/cm$^2$. Solutions of the polymers (0.005-0.01% w/v) were prepared in 9:1 acetone: toluene. A thin film of a polymer was applied to the substrate by spray coating a polymeric solution onto the substrate and air drying. The coated substrates were placed under a UV lamp ($\lambda_{em}$=302 nm) to excite the polymer fluorescence. Dark spots in the film indicate luminescence quenching of the polymer by the analyte. For PSF1-1, the substrate was left under the UV lamp for 1 min. A green-yellow luminescence indicates the presence of nitrate ester-based or nitramine-based explosives. The persistence of a bright blue spot indicates the presence of the non-conjugated dicumyl peroxide or di-t-butylperoxide. The process was carried out for each of the explosive analytes as well as possible interferents.

The PSF1-1-3 tests showed that nitrogen containing explosives may be visually detected in picogram quantities by fluorescence quenching of photo-luminescent silafluorene-based copolymers. Detection limits depend on the specific explosive analyte. Illumination with a black light ($\lambda_{em}$~302 nm) excites the polymer fluorescence near 370-550 nm. Luminescence quenching is visually observed immediately on illumination. Polymers PSF1 1-3 are photodegradable if left in ambient light more than two weeks. However PSF12-3 are photo-stable for several days. These polymers present an inexpensive and simple means to detect picogram levels of nitroaromatic explosives.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A sensor for detecting nitrogen containing high explosives, the sensor comprising:
   a substrate; and
   a blue-photoluminescent metallofluorene copolymer to be carried on said substrate during testing for nitrogen containing high explosives, wherein said blue-photoluminescent metallofluorene copolymer comprises an alternating silafluorene-divinylfluorene copolymer, an alternating silafluorene-dimethyldivinylfluorene copolymer, or an alternating silafluorene-divinylspirobifluorene copolymer, said blue-photoluminescent metallofluorene copolymer having a Si-C bond in a copolymer backbone, the copolymer backbone having a vinyl bridge.

2. The sensor of claim 1, wherein said blue-photoluminescent metallofluorene copolymer is coated on said substrate.

3. The sensor of claim 1, wherein said blue-photoluminescent metallofluorene copolymer is stored separately from said substrate coating and applied to said substrate during testing.

4. The sensor of claim 3, packaged in a test kit with said blue-photoluminescent metallofluorene copolymer stored in a container that inhibits photodegredation.

5. The sensor of claim 1 wherein the alternating silafluorene-divinylfluorene copolymer comprises silafluorene-2,7-divinylfluorene, the alternating silafluorene-dimethyldivinylfluorene copolymer comprises silafluorene-9,9-dimethyl-2,7-divinylfluorene, or the alternating silafluorene divinylspirobifluorene copolymer comprises silafluorene-2,7 divinylspirobifluorene.

6. The sensor of claim 1 wherein the alternating silafluorene-divinylfluorene copolymer comprises a copolymer formed by the catalytic hydrosilation of 1,1-dihydrosilafluorene with 2,7-diethynylfluorene, or the alternating silafluorene-dimethyldivinylfluorene copolymer comprises a copolymer formed by the catalytic hydrosilation of 1,1-dihydrosilafluorene with 9,9-dimethyl-2,7-diethynylfluorene, or the alternating silafluorene-divinylspirobifluorene copolymer comprises a copolymer formed by the catalytic hydrosilation of 1,1-dihydrosilafluorene with 2,7-diethynylspirobifluorene.

7. A method for detecting nitrogen containing high explosives, the method comprising steps of:
   exposing a blue-photoluminescent metallofluorene copolymer carried on a substrate to an analyte, wherein said blue-photoluminescent metallofluorene copolymer comprises an alternating silafluorene-divinylfluorene copolymer, an alternating silafluorene-dimethyldivinylfluorene copolymer, or an alternating silafluorene-divinylspirobifluorene copolymer, said blue-photoluminescent metallofluorene copolymer having a Si—C bond in a copolymer backbone, the copolymer backbone having a vinyl bridge;

exciting the blue-photoluminescent metallofluorene copolymer to luminesce;

observing the blue-photoluminescent metallofluorene copolymer for fluorescence quenching indicative of nitrogen containing high explosives.

8. The method of claim 7, wherein said step of exciting comprises exciting the blue-photoluminescent metallofluorene copolymer with an illumination source.

9. The method of claim 7, wherein said step of exciting comprises exciting the blue-photoluminescent metallofluorene copolymer electrically.

10. The method of claim 9, wherein said step of exposing comprises:

contacting the substrate to the analyte; and then, applying the blue-photoluminescent metallofluorene copolymer to the substrate.

11. The method of claim 10, wherein said step of applying comprises spray coating.

12. The method of claim 7, wherein said step of observing comprises visual inspection by a human observer.

13. The method of claim 7, wherein said step of observing comprises electronic observation.

14. The method of claim 7 wherein the alternating silafluorene-divinylfluorene copolymer comprises silafluorene-2,7-divinylfluorene, the alternating silafluorene-dimethyldivinylfluorene copolymer comprises silafluorene-9,9-dimethyl-2,7-divinylfluorene, or the alternating silafluorene divinylspirobifluorene copolymer comprises silafluorene-2,7 divinylspirobifluorene.

15. The method of claim 7 wherein the alternating silafluorene-divinylfluorene copolymer comprises a copolymer formed by the catalytic hydrosilation of 1,1-dihydrosilafluorene with 2,7-diethynylfluorene, or the alternating silafluorene-dimethyldivinylfluorene copolymer comprises a copolymer formed by the catalytic hydrosilation of 1,1-dihydrosilafluorene with 9,9-dimethyl-2,7-diethynylfluorene, or the alternating silafluorene-divinylspirobifluorene copolymer comprises a copolymer formed by the catalytic hydrosilation of 1,1-dihydrosilafluorene with 2,7-diethynylspirobifluorene.

16. A method for synthesizing a vinyl bridged silafluorene copolymer, the method comprising:

providing diethynyl-x-fluorene and dihydrosilafluorene as precursors wherein the diethynyl-x-fluorene comprises 2,7-diethynylfluorene, 9,9-dimethyl-2,7-diethynylfluorene, or 2,7-diethynylspirobifluorene; and conducting catalytic hydrosilation of the precursors.

17. The method of claim 16, wherein said step of conducting uses $H_2PtCl_6 \cdot xH_2O$ for catalytic hydrosilation of the precursors.

18. The method of claim 17, wherein said step of conducting is conducted by stirring the diethynyl-x-fluorene and dihydrosilafluorene precursors with a hydrosilation catalyst in dry toluene (1mL) at 100° C. for 24 h.

19. The method of claim 16, wherein the dihydrosilafluorene comprises 1,1-dihydrosilafluorene.

20. A copolymer of a polymetallofluorene and a polyacetylene polymer wherein the copolymer comprises an alternating silafluorene-divinylfluorene copolymer, an alternating silafluorene-dimethyldivinylfluorene copolymer, or an alternating silafluorene-divinylspirobifluorene copolymer, the copolymer having a Si—C bond in a copolymer backbone, the copolymer backbone having a vinyl bridge.

21. The copolymer of claim 20, suspended in a volatile organic solvent.

22. The copolymer of claim 20 wherein the alternating silafluorene-divinylfluorene copolymer comprises silafluorene-2,7-divinylfluorene, the alternating silafluorene-dimethyldivinylfluorene copolymer comprises silafluorene-9,9-dimethyl-2,7-divinylfluorene, or the alternating silafluorene divinylspirobifluorene copolymer comprises silafluorene-2,7- divinylspirobifluorene.

23. The copolymer of claim 20 wherein the alternating silafluorene-divinylfluorene copolymer comprises a copolymer formed by the catalytic hydrosilation of 1,1-dihydrosilafluorene with 2,7-diethynylfluorene, or the alternating silafluorene-dimethyldivinylfluorene copolymer comprises a copolymer formed by the catalytic hydrosilation of 1,1-dihydrosilafluorene with 9,9-dimethyl-2,7-diethynylfluorene, or the alternating silafluorene-divinylspirobifluorene copolymer comprises a copolymer formed by the catalytic hydrosilation of 1,1-dihydrosilafluorene with 2,7-diethynylspirobifluorene.

24. In a blue emitting organic light emitting diode, an emitting layer comprising a blue-photoluminescent metallofluorene copolymer comprising an alternating silafluorene-divinylfluorene copolymer, an alternating silafluorene-dimethyldivinylfluorene copolymer, or an alternating silafluorene divinylspirobifluorene copolymer, said blue-photoluminescent metallofluorene copolymer having a Si-C bond in a copolymer backbone, the copolymer backbone having a vinyl bridge.

25. The diode of claim 24 wherein the alternating silafluorene-divinylfluorene copolymer comprises silafluorene-2,7-divinylfluorene, the alternating silafluorene-dimethyldivinylfluorene copolymer comprises silafluorene-9,9-dimethyl-2,7-divinylfluorene, or the alternating silafluorene-divinylspirobifluorene copolymer comprises silafluorene-2,7-divinylspirobifluorene.

26. The diode of claim 24 wherein the alternating silafluorene-divinylfluorene copolymer comprises a copolymer formed by the catalytic hydrosilation of 1,1-dihydrosilafluorene with 2,7-diethynylfluorene, or the alternating silafluorene-dimethyldivinylfluorene copolymer comprises a copolymer formed by the catalytic hydrosilation of 1,1-dihydrosilafluorene with 9,9-dimethyl-2,7-diethynylfluorene, or the alternating silafluorene-divinylspirobifluorene copolymer comprises a copolymer formed by the catalytic hydrosilation of 1,1-dihydrosilafluorene with 2,7-diethynylspirobifluorene.

* * * * *